United States Patent
Brigmohan (10) Patent No.: US 10,261,921 B2
(45) Date of Patent: Apr. 16, 2019

(54) UNIVERSAL SECURE PLATFORM VIRTUALIZATION SYSTEM AND METHOD THEREOF

(71) Applicant: Rajnarine Brigmohan, New York, NY (US)

(72) Inventor: Rajnarine Brigmohan, New York, NY (US)

(*) Notice: Subject to any disclaimer, the term of this patent is extended or adjusted under 35 U.S.C. 154(b) by 351 days.

(21) Appl. No.: 15/048,697

(22) Filed: Feb. 19, 2016

(65) Prior Publication Data
US 2016/0170915 A1  Jun. 16, 2016

(51) Int. Cl.
| | |
|---|---|
| *G06F 13/10* | (2006.01) |
| *G06F 13/16* | (2006.01) |
| *G06F 13/40* | (2006.01) |
| *G06F 13/42* | (2006.01) |
| *G06F 9/455* | (2018.01) |
| *G06F 21/60* | (2013.01) |
| *G06F 21/57* | (2013.01) |

(52) U.S. Cl.
CPC ........ *G06F 13/102* (2013.01); *G06F 9/45558* (2013.01); *G06F 13/16* (2013.01); *G06F 13/4068* (2013.01); *G06F 13/4282* (2013.01); *G06F 21/575* (2013.01); *G06F 21/602* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 2006/0176146 | A1* | 8/2006 | Krishan | G06F 21/32 340/5.53 |
| 2009/0007147 | A1* | 1/2009 | Craft | G06F 9/455 719/320 |
| 2010/0169497 | A1* | 7/2010 | Klimentiev | G06F 9/546 709/228 |
| 2010/0299518 | A1* | 11/2010 | Viswanathan | H04L 9/083 713/152 |
| 2011/0289134 | A1* | 11/2011 | de los Reyes | H04L 63/20 709/203 |
| 2015/0277867 | A1* | 10/2015 | Hasabnis | G06F 8/433 717/164 |

* cited by examiner

*Primary Examiner* — Idriss N Alrobaye
*Assistant Examiner* — Dayton Lewis-Taylor
(74) *Attorney, Agent, or Firm* — Barry Choobin; Patent 360

(57) ABSTRACT

The embodiments herein provide a secure platform and application virtualization system comprising a universal secure platform virtualization system (USPVS) platform device, a cloud environment and a USPVS portable key device. The USPVS platform is an external computing device having a specific set of protocols to interact with a computing device. The USPVS platform is connected to a plurality of virtual as well as physical cloud environment. The USPVS portable key device is connected to the USPVS platform. The USPVS portable key device holds an encryption key with a Unique ID. The USPVS portable key device comprises a Universal Serial Bus port for connection of a tertiary external device. The USPVS platform has a decryption key for the encryption key of the USPVS portable device.

8 Claims, 6 Drawing Sheets

UNIVERSAL SECURE PLATFORM VIRTUALIZATION SYSTEM AND METHOD THEREOF

BACKGROUND

Technical Field of Invention

The embodiments herein generally relate to a computer readable method and a system to execute the computer readable method and particularly relate to a secure method for virtualization of an operating system and computer readable applications. The embodiments herein more particularly relate to a virtualization device connected to a computing device to create a virtual copy of an operating system and a plurality of computer readable applications to improve a processing speed and security of the computing device.

Description of Related Art

An application virtualization is a software technology that encapsulates computer programs from the underlying operating system on which it is executed. A fully virtualized application is not installed in the traditional sense but executed in the same way. The application behaves like it is directly interfacing with the original operating system and all the resources managed by it, but can be isolated or sandboxed to varying degrees.

In computing, a process is an instance of a computer program that is being executed. It contains the program code and its current activity. Depending on the operating system (OS), a process may be made up of multiple threads of execution that execute multiple instructions concurrently. A computer program is a passive collection of instructions while the process is the actual execution of those instructions. Several processes may be associated with the same program; for example, opening up several instances of the same program often means more than one process is being executed which is known as multitasking. In the multitasking, each CPU executes a single task at a time. However, the multitasking allows each processor to switch between tasks that are being executed without having to wait for each task to finish. Depending on the operating system implementation, switches could be performed when tasks perform input/output operations, when a task indicates that it can be switched, or on hardware interrupts.

One of the prior arts discloses an automated application modelling for application virtualization (auto-modelling) may be incorporated into an application installer and/or other suitable component of a computer operating system. Auto-modelling may be performed by an auto-modelling agent. The auto-modelling agent may employ one or more of multiple auto-modelling strategies. The auto-modelling agent may assess one or more of a particular application, application installation package and/or application environment in order to determine a suitable auto-modelling strategy. The auto-modelling strategies may include active auto-modelling and passive auto-modelling.

Another prior art discloses an intercloud application virtualization through a method and a system for providing an application to be executed on a plurality of computer systems. The method includes providing an interface for each computer system. The interface includes at least one application container and migrating a script of the application into each of the plurality of the computer systems through the corresponding interface. The script is executable in the at least one application container of the interface for each interface.

Yet another prior art discloses an extensible virtualization system provides an object model and manages a virtual application lifecycle in a way that allows new virtualization subsystems to be added to extend a virtualization product without reworking the product itself. The virtualizing an application generally involves three steps: metadata extraction, metadata storage and reconstitution, and runtime management of requests. The extensible virtualization system receives notification of an application preparation session and allows virtualization subsystems to monitor the session to collect configuration information specific to each subsystem that the application uses to run on a client. Each subsystem provides collected information to the extensible virtualization system, which stores the collected information until the application to be virtualized is deployed. When the application is deployed, the system invokes the same virtualization subsystem and provides the subsystem with the stored information.

However, the conventional virtualization system and process creates only virtual application lifecycle and have local permanent storage executed steps. This lowers a security aspect of the virtualization system as the data can be extracted at any time point by a third party, if the third party gets access to the storage unit of the prior art's virtualization system. Also, the conventional virtualization systems are mostly specific to a computing device, thus becomes redundant when used with other devices. Further, the conventional virtualization systems are incompatible to interact with various network environments.

In the view of foregoing, there is a need for a secure platform virtualization system and a method for virtualization and execution of a plurality of applications and an operating system of an attached computing device through the system. Also there is a need for a secure virtualization platform compatible with various network environments comprising a Personal Area Network (PAN), a Local Area Network (MAN), a Wide Area Network (WAN), a Metropolitan Area Network (MAN), a Storage Area Network (SAN), an Enterprise Private Network (EPN) and a Virtual Private Network (VPN). Further there is a need for a system and a method with a temporary storage of the executed virtualization of the plurality of applications and the operating system. Further there is a need for a system and a method for secure wireless data transfer among a plurality of computing devices.

The above mentioned shortcomings, disadvantages and problems are addressed herein, as detailed below.

SUMMARY OF THE INVENTION

The primary object of the embodiments herein is to provide a secure platform virtualization system and a method for virtualization and execution of a plurality of applications and an operating system of an attached computing device through the system.

Another object of the embodiments herein is to a secure virtualization platform compatible with various network environments comprising a Personal Area Network (PAN), a Local Area Network (MAN), a Wide Area Network (WAN), a Metropolitan Area Network (MAN), a Storage Area Network (SAN), an Enterprise Private Network (EPN) and a Virtual Private Network (VPN).

Yet another object of the embodiments herein is to provide a secure platform virtualization system and a method with a temporary storage of the executed virtualization of the plurality of applications and the operating system.

Yet another object of the embodiments herein is to provide a secure platform virtualization system and a method for secure wireless data transfer among a plurality of computing devices.

The embodiments herein provide a secure virtualization system comprising a universal secure platform-virtualization system (USPVS) platform, a cloud environment and a USPVS portable key device. The USPVS platform is an external computing device having a specific set of protocols to interact with a computing device. The USPVS platform is connected to a plurality of virtual as well as physical cloud environment. The USPVS portable key device is connected to the USPVS platform. The USPVS portable key device holds an encryption key with a Unique ID. The USPVS portable key device comprises a Universal Serial Bus port for connection of a tertiary external device. The USPVS platform has a decryption key for the encryption key of the USPVS portable device.

According to an embodiment herein, the USPVS platform comprises:
a source code;
a central processing module, wherein the central processing module compiles and executes the source code;
a Random Access Memory (RAM), wherein the RAM is connected to the central processing module;
a secondary storage memory,
a plurality of interface ports for cloud computing,
a storage module for the encryption algorithms for a port authentication security,
a virtualization module,
  a network interface virtualization,
  a central processor virtualization,
  a memory allocation to virtualized environment,
  a private user space storage.

According to an embodiment herein, a data processed during virtualization of the operating system and the plurality of applications are temporarily stored for reading, writing and executing in the RAM.

According to an embodiment herein, the USPVS portable key device further comprises:
a source code;
a user interface module;
an internet service provider module;
a port encryption key ID;
a local internet browsing module;
a network module;
a support module;
a universal bus interface module;
a operating system layer GUI;
a application layer GUI.

According to an embodiment herein, the user interface module has a multi-ethnic layer security to perform the protocols of a remote code execution within a computing environment.

According to an embodiment herein, the USPVS platform is connected with the computing device through the cloud environment. The computing device comprises a laptop, a Personal Computer, a palmtop, a Smartphone and a tablet.

According to an embodiment herein, the cloud environment comprises a Personal Area Network (PAN), a Local Area Network (LAN), a Wide Area Network (WAN), a Metropolitan Area Network (MAN), a Storage Area Network (SAN), an Enterprise Private Network (EPN) and a Virtual Private Network (VPN).

According to an embodiment herein, the USPVS platform comprises an instruction set having compatibility with 16-bit, ∎-bit and 64-bit processors of the computing devices.

According to an embodiment herein, the cloud environment acts as a channel for communication to transmit a data without temporarily or permanently storing.

The embodiments herein provide a method for virtualization of an operating system and a plurality of applications of a computing device. The method comprises logging into the operating system by the user through the USPVS portable key device to load the operating system (OS) on the USPVS platform. On logging, a data of the operating system and the plurality of applications is compiled through a source code over the USPVS platform. The compiled data comprises a plurality of computing instructions of the operating system and libraries for the plurality of applications. Then, a secure tunnel is created between a central processing unit and the operating system of the computing device connected with the USPVS platform. The secure tunnel creation leads to a script awaiting an authentication of the USPVS platform. Further, a remote code execution task is performed on the USPVS platform and an encrypted content is displayed for the executed OS virtualization and the plurality of applications. On shutting down of the operating system or an application, the tunnel for corresponding operation is broken.

According to an embodiment herein, the breaking of tunnel restricts an access of an unauthorized computing device to the operating system or the application.

According to an embodiment herein, the remote code is executed in a single instance session for virtualization of the operating system and the applications.

According to an embodiment herein, the USPVS platform works in a cloud network environment comprising a Personal Area Network (PAN), a Local Area Network (LAN), a Wide Area Network (WAN), a Metropolitan Area Network (MAN), a Storage Area Network (SAN), an Enterprise Private Network (EPN) and a Virtual Private Network (VPN).

According to an embodiment herein, the cloud network environment acts as a channel for communication to transmit a data without temporarily or permanently storing.

According to an embodiment herein, the communication channel for connecting the computing device is a standalone domain based connection with virtual interfaces to communicate data across networks. The networks comprises a Personal Area Network (PAN), a Local Area Network (LAN), a Wide Area Network (WAN), a Metropolitan Area Network (MAN), a Storage Area Network (SAN), an Enterprise Private Network (EPN), a Virtual Private Network (VPN), switches and routers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a secure virtualization system comprising a universal secure platform-virtualization system (USPVS) platform, a cloud environment and a USPVS portable key device. The USPVS platform is an external computing device having a specific set of protocols to interact with a computing device. The USPVS platform is connected to a plurality of virtual as well as physical cloud environment. The USPVS portable key device is connected to the USPVS platform. The USPVS portable key device holds an encryption key with a Unique ID. The USPVS portable key device comprises a Universal Serial Bus port for connection of a tertiary external device. The USPVS platform has a decryption key for the encryption key of the USPVS portable device.

According to an embodiment herein, the USPVS platform comprises:
a source code;
a central processing module, wherein the central processing module compiles and executes the source code;
a Random Access Memory (RAM), wherein the RAM is connected to the central processing module;
a secondary storage memory,
a plurality of interface ports for cloud computing,
a storage module for the encryption algorithms for a port authentication security,
a virtualization module,
  a network interface virtualization,
  a central processor virtualization,
  a memory allocation to virtualized environment,
  a private user space storage.

According to an embodiment herein, a data processed during virtualization of the operating system and the plurality of applications are temporarily stored for reading, writing and executing in the RAM.

According to an embodiment herein, the USPVS portable key device further comprises:
a source code;
a user interface module;
an internet service provider module;
a port encryption key ID;
a local internet browsing module;
a network module;
a support module;
a universal bus interface module;
a operating system layer GUI;
a application layer GUI.

According to an embodiment herein, the user interface module has a multi-ethnic layer security to perform the protocols of a remote code execution within a computing environment.

According to an embodiment herein, the USPVS platform is connected with the computing device through the cloud environment. The computing device comprises a laptop, a Personal Computer, a palmtop, a Smartphone and a tablet.

According to an embodiment herein, the cloud environment comprises a Personal Area Network (PAN), a Local Area Network (LAN), a Wide Area Network (WAN), a Metropolitan Area Network (MAN), a Storage Area Network (SAN), an Enterprise Private Network (EPN) and a Virtual Private Network (VPN).

According to an embodiment herein, the USPVS platform comprises an instruction set having compatibility with 16-bit, 32-bit and 64-bit processors of the computing devices.

According to an embodiment herein, the cloud environment acts as a channel for communication to transmit a data without temporarily or permanently storing.

Figure 1A:
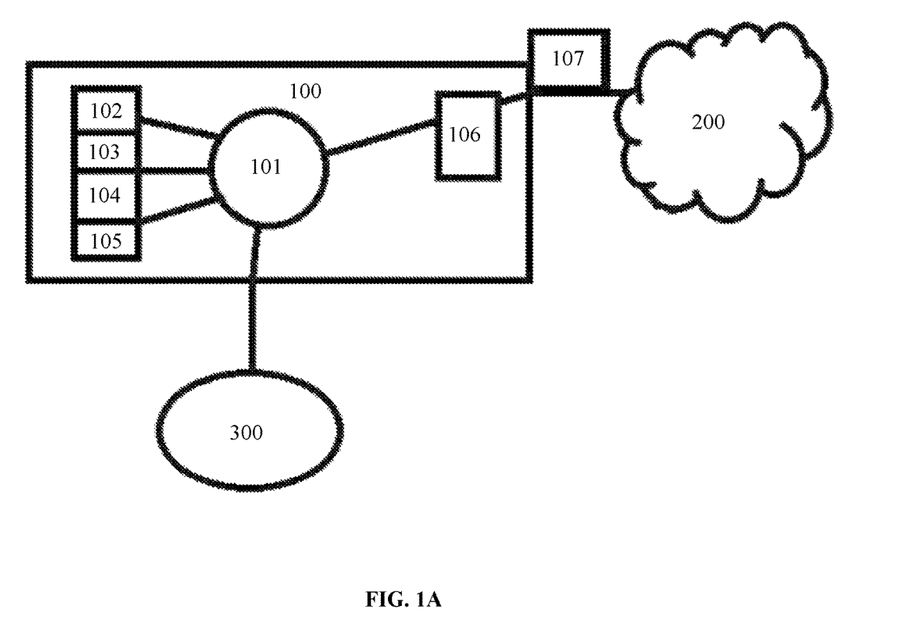
FIG. 1A illustrates a schematic diagram of the USPVS platform connected with the cloud environment and the USPVS portable key device for virtualization of operating system and application, according to an embodiment herein.

FIG. 1A illustrates a schematic diagram of the USPVS platform connected with the cloud environment and the USPVS portable key device for virtualization of operating system and application, according to an embodiment herein. With respect to FIG. 1A, the USPVS platform 100 executes commands directly to the CPU 102 of the computing device by creating a virtual operating system to execute the commands and a plurality of software modules and applications. The source code 101 executes an operating system initiation and is directly connected to the CPU 102 through the USPVS platform 100. The USPVS platform 100 is connected to the computing device through the cloud environment 200. The source code executes the OS and application virtualization through the virtualization module 105. The virtualization module 105 performs a plurality of application virtualization comprising a network interface virtualization, and a central processor virtualization, a memory allocation to virtualized environment and a private user space storage. A Random Access Memory (RAM) 103 is also provided for processing and storing data instructions temporarily. A backup for all the executed programs is stored on a secondary memory 104 for reading, writings and executing files. The purpose of the USPVS platform 100 is to utilize the resources of a computer system properly and efficiently. At-least one interface port 107 communicates with the existing computer protocols through the wireless communication medium in the cloud environment 200. An encryption module 106 is built into the USPVS platform to cater a private secure environment to each user by using encryption algorithms. The source code 101 also accesses the USPVS portable key device 300 to allow an authenticated user log in into the virtualized operating system.

Figure 1B:
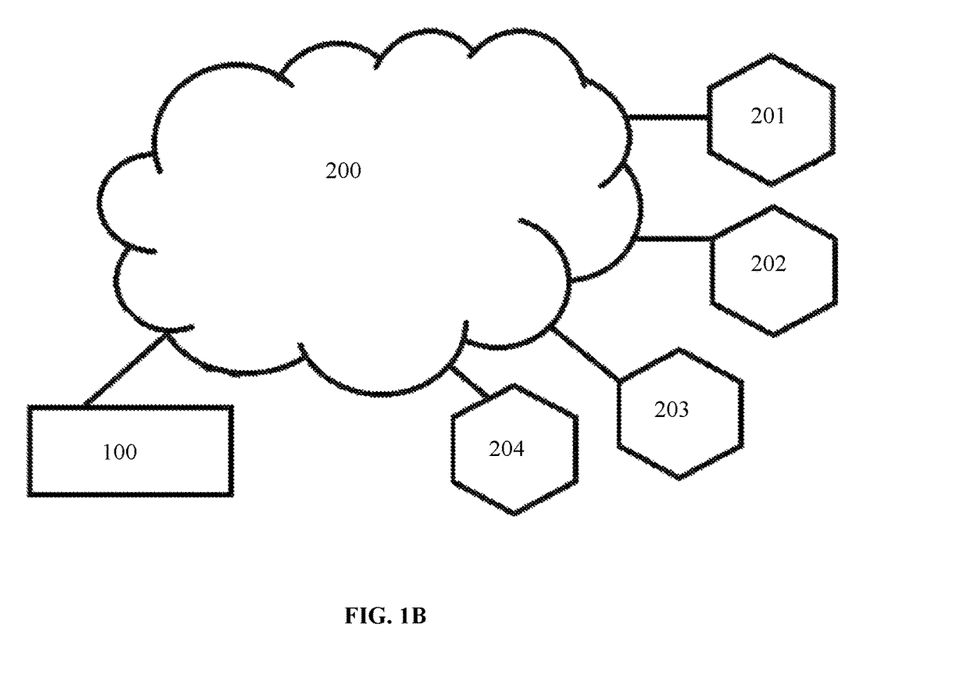
FIG. 1B illustrates a schematic diagram of the cloud environment connected with the USPVS platform and the USPVS portable key device for virtualization of operating system and application, according to an embodiment herein.

FIG. 1B illustrates a schematic diagram of the cloud environment connected with the USPVS platform and the USPVS portable key device for virtualization of operating system and application, according to an embodiment herein. With respect to FIG. 1B, the cloud environment 300 is a wireless network environment to provide a connectivity of the USPVS platform 100 with the computing device. The cloud environment 200 which is internet access itself consist of various different technologies comprising WAN 201, LAN 202, PAN 203, SAN, EPN and VPN. The data transferred in WAN 201 environment is controlled by multiple routers and switches through computer protocols across larger distances. In the LAN 202 environment data is communicated through one router or switch device in a local business or home. When a user is in a private area network (PAN) 203, the data is transferred but not shared with the cloud environment. The PAN environment uses predetermined protocols to communicate outside its environment. An internet access is provide by your mobile carrier, Phone Company or Cable Company 204.

Figure 1C:
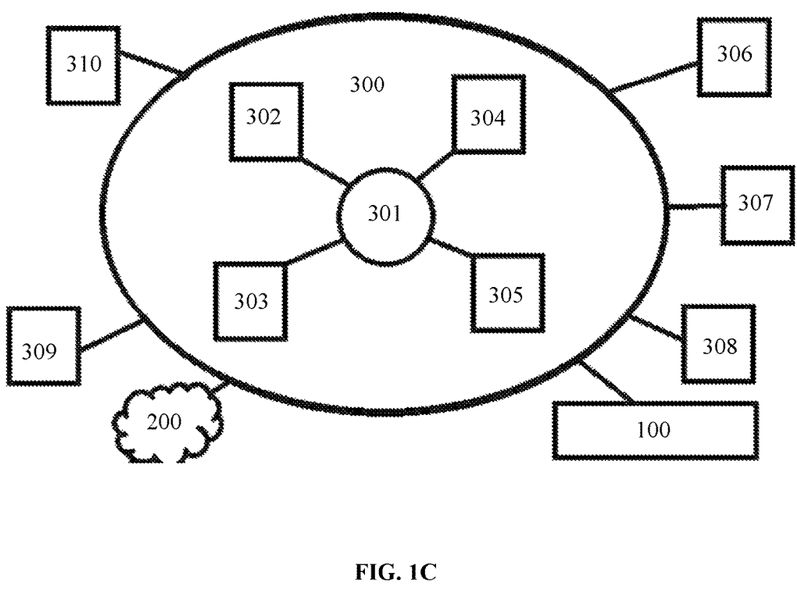
FIG. 1C illustrates a schematic diagram of the cloud environment connected with the USPVS platform and the USPVS portable key device for virtualization of operating system and application, according to an embodiment herein.

FIG. 1C illustrates a schematic diagram of the USPVS portable key device connected with the USPVS platform and the cloud environment for virtualization of operating system and application, according to an embodiment herein. With respect to FIG. 1C, the USPVS portable key device 300 is the only way a user can access the cloud environments 200 on the USPVS platform 100. The USPVS portable key device 300 is programmed from the source code 301 to utilize certain modules. The USPSV portable key device creates a user interface 302 to prevent a remote code execution from unauthorized instructions. Each USPVS portable key device 300 has its own unique ID 303 that is decrypted only by a compatible USPVS platform design and then the USPVS platform 100 accessibility is granted to the user. The USVS portable key device comprises a networking module 308 give the users the ability to identify and access the network protocols. The existing technology communications are available through an internet service provider 304. The USPVS portable key device 300 also provides support modules 306 to provide information and FAQ pertaining to the virtualization and execution of the software application to the end users help. The USPVS portable key device 300 is built with local internet browsing capabilities through the internet browsing module 305. The USB (Universal Serial Bus) devices are attached directly to the USPVS portable key device 300 through the USB port 310 for establishing commutation of data to a user space. The operating system's interface is accessed remotely by code execution of an operating system layer GUI 309 and the software applications are accessed by a code execution of an application layer GUI 307.

Figure 2:
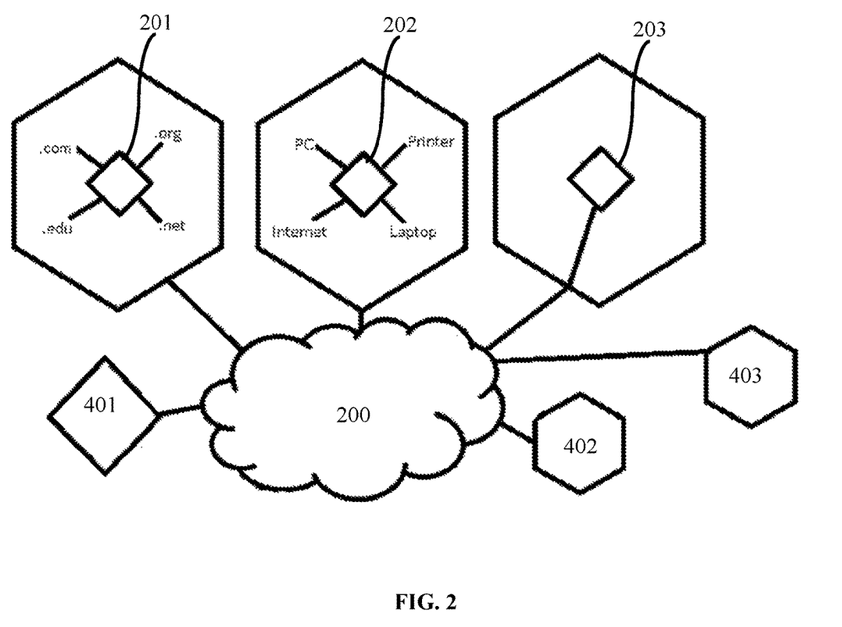
FIG. 2 illustrates a schematic diagram of the network devices and topologies connected to the computing device and the USPVS platform, according to an embodiment herein.

FIG. 2 illustrates a schematic diagram of the network devices and topologies connected to the computing device and the USPVS platform, according to an embodiment herein. With respect to FIG. 2, the cloud environment 200 facilitates a user to use the USPVS platform in various wireless network like WAN 201, LAN 202 and PAN 203. The WAN network 201 provides a user access to global network comprising .com, .edu, .org and .net domains while the LAN network 202 facilitates a wireless access to a Personal Computer, a Laptop, a local internet browsing, a printer, a scanner and a plurality of locally available computing resources. The PAN network 203 provides a cloud access to the user for connectivity to a plurality of computing devices and transferring of data. The cloud environment provides the user access to the various network through the network devices like switches 401, routers 402 and nodes 403.

According to an exemplary embodiment, a cloud network consist of many interconnected devices that communicate data across the internet using one or more domains. The data is transferred in a home or small business using the internet protocol for web browsing through the PAN network and communicated without any interactions with the internet to a plurality of computing devices. Every device that is connected to the internet has a unique ID. These unique IDs are managed by devices and protocols to communicate data to each other. When multiple devices needs to communicate across a network and different protocols are needed and quality of services are managed.

Figure 3:
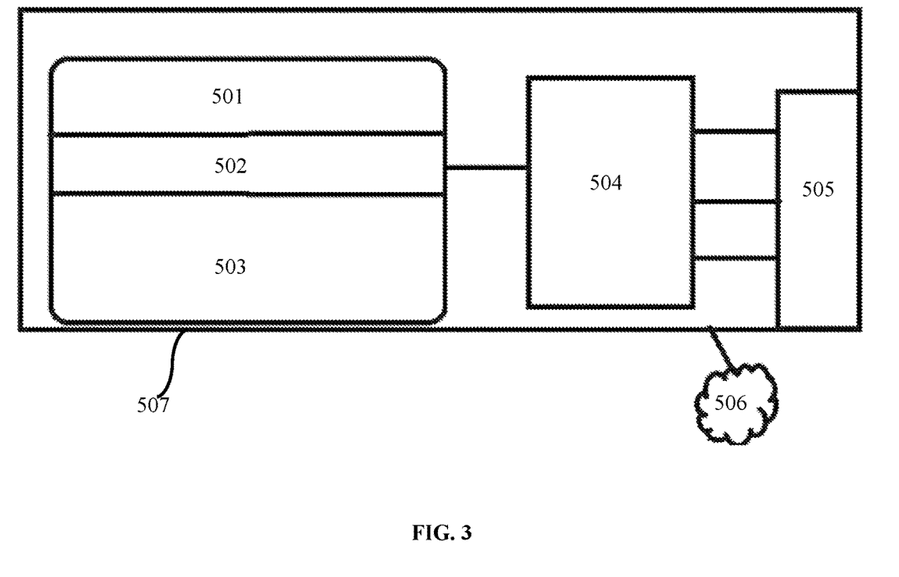
FIG. 3 illustrates a schematic diagram of the computing device connected to the USPOVS platform device through the cloud environment, according to an embodiment herein.

FIG. 3 illustrates a schematic diagram of the computing device connected to the USPOVS platform device through the cloud environment, according to an embodiment herein. With respect to FIG. 3, the computing device generally boots up an operating system 504 on powering-on, followed by starting of user-initiated or auto-initiated software modules or computer readable applications 505. The program instructions for the computer readable programs are temporarily stored in the Random Access Memory (RAM) 501 and a flash memory or secondary memory 503. The running computer readable programs are processed through the CPU 502 and are displayed on the monitor 507. The computer readable programs 505 are either stored on the hard drive of the computing devices or accessed real time through an internet access 506.

Figure 4:
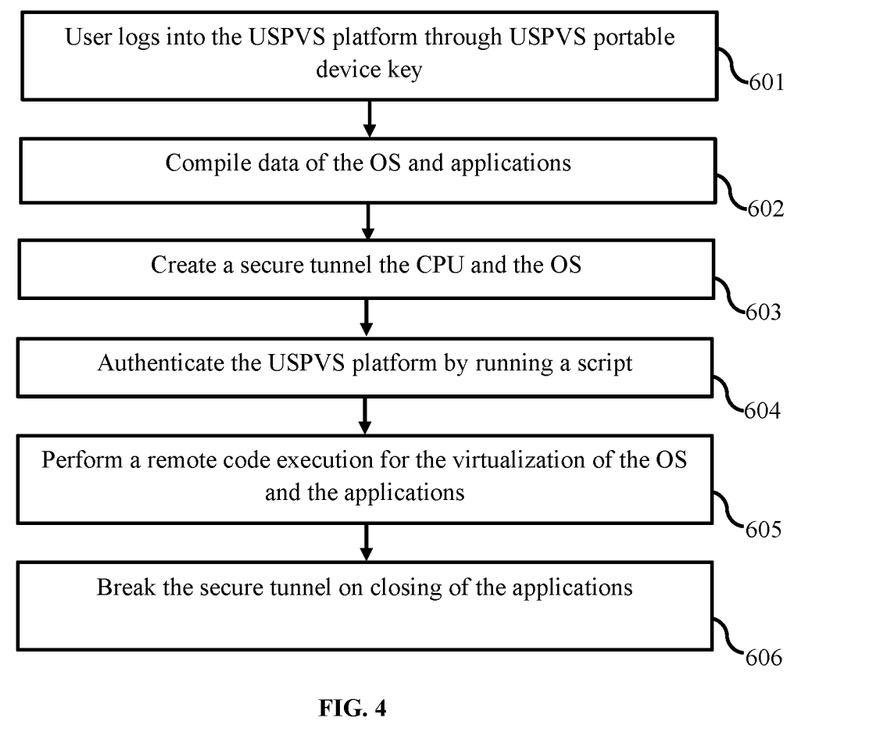
FIG. 4 illustrates a flowchart of the method for virtualization of the operating system and the plurality of applications, according to an embodiment herein.

FIG. 4 illustrates a flowchart of the method for virtualization of the operating system and the plurality of applications, according to an embodiment herein. With respect to FIG. 4, the method comprises logging into the operating system by the user through the USPVS portable key device to load the operating system (OS) on the USPVS platform (601). On logging, a data of the operating system and the plurality of applications is compiled through a source code over the USPVS platform (602). The compiled data comprises a plurality of computing instructions of the operating system and libraries for the plurality of applications. Then, a secure tunnel is created between a central processing unit and the operating system of a computing device connected with the USPVS platform (603). The secure tunnel creation leads to a script awaiting an authentication of the USPVS platform (604). Further, a remote code execution task is performed on the USPVS platform and an encrypted content is displayed for an OS virtualization tasks and a plurality of application executions (605). On shutting down of the operating system or an application, the tunnel for corresponding operation is broken (606).

According to an embodiment herein, the breaking of tunnel restricts an access of an unauthorized computing device to the operating system or the application.

According to an embodiment herein, the remote code is executed in a single instance session for virtualization of the operating system and the applications.

According to an embodiment herein, the USPVS platform works in a cloud network environment comprising a Personal Area Network (PAN), a Local Area Network (LAN), a Wide Area Network (WAN), a Metropolitan Area Network (MAN), a Storage Area Network (SAN), an Enterprise Private Network (EPN) and a Virtual Private Network (VPN).

According to an embodiment herein, the cloud network environment acts as a channel for communication to transmit a data without temporarily or permanently storing.

According to an embodiment herein, the communication channel for connecting the computing device is a standalone domain based connection with virtual interfaces to communicate data across networks. The networks comprises a Personal Area Network (PAN), a Local Area Network (LAN), a Wide Area Network (WAN), a Metropolitan Area Network (MAN), a Storage Area Network (SAN), an Enterprise Private Network (EPN), a Virtual Private Network (VPN), switches and routers.

The present inventions provides a secure access to the computing device's operating system and computer readable program (software applications), thus facilitating a data security. The present system also provides fast execution of the software applications as the data instructions are directly transferred to the CPU, while in the conventional computing devices an instruction has to hog multiple data components before reaching the CPU. In the present system, an operating system implementation into memory is done by allocation of resources on a demand basis which creates accurate computing environments and memory utilization is private. Further, the data is not stored during a data transfer through the cloud network unlike the conventional system which adds to a secure transfer over the cloud networks.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A secure platform and application virtualization system comprising:
   a universal secure platform virtualization system (US-PVS) platform, wherein the USPVS platform is an external computing device having a specific set of protocols to interact with a computing device, wherein the USPVS platform further comprises:
      a source code;
      a central processing module, wherein the central processing module compiles and executes the source code;
      a Random Access Memory (RAM), wherein the RAM is connected to the central processing module, wherein a data processed during virtualization of the operating system and a plurality of applications is temporarily stored for reading, writing and executing in the RAM,
   a cloud environment, wherein the USPVS platform is connected to a plurality of virtual as well as physical cloud environment; wherein the cloud environment acts as a communication channel to transmit a data without storing either temporarily or permanently;
   a USPVS portable key device, logging into the operating system through the USPVS portable key device to load the operating system (OS) on the USPVS platform; wherein the USPVS portable key device is connected to the USPVS platform, wherein the USPVS portable key device holds an encryption key with a Unique ID, wherein the USPVS portable key device comprises a Universal Serial Bus port for connection of a tertiary external device;
   wherein, the USPVS platform has a decryption key for the encryption key of the USPVS portable device; wherein the USPVS portable key device is configured to:
      create a secure tunnel between a central processing unit of a computing device connected with the USPVS platform and the operating system, wherein the creating of secure tunnel lead to a script awaiting an authentication of the USPVS platform, and display an encrypted content for an OS virtualization tasks and a plurality of application executions.

2. The system according to claim 1, wherein the USPVS platform comprises:
   a secondary storage memory,
   a plurality of interface ports for cloud computing,
   a storage module for the encryption algorithms for a port authentication security,
   a virtualization module,
   a network interface virtualization,
   a central processor virtualization,
   a memory allocation to virtualized environment,
   a private user space storage.

3. The system according to claim 1, wherein the USPVS portable key device further comprises:
   a source code;
   a user interface module;
   an internet service provider module;
   a port encryption key ID;
   a local internet browsing module;
   a network module;
   a support module;
   a universal bus interface module;
   a operating system layer GUI;
   a application layer GUI.

4. The system according to claim 1, wherein the USPVS platform is connected with the computing device through the cloud environment, wherein the computing devices comprises a laptop, a Personal Computer, a palmtop, a Smartphone and a tablet.

5. The system according to claim 4, wherein the cloud environment comprises a Personal Area Network (PAN), a Local Area Network (LAN), a Wide Area Network (WAN), a Metropolitan Area Network (MAN), a Storage Area Network (SAN), an Enterprise Private Network (EPN) and a Virtual Private Network (VPN).

6. The system according to claim 1, wherein the USPVS platform comprises an instruction set having compatibility with 16-bit, 32-bit and 64-bit processors of the computing devices.

7. A method for virtualization of an operating system and a plurality of applications comprising the steps of:
   logging into the operating system through the USPVS portable key device to load the operating system (OS) on the USPVS platform, wherein the USPVS platform works in a cloud network environment that acts as a communication channel to transmit a data without storing either temporarily or permanently;
   compiling a data of the operating system and the plurality of applications through a source code over a USPVS platform, wherein the compiled data comprises a plurality of computing instructions of the operating system and libraries for the plurality of applications;
   creating a secure tunnel between a central processing unit of a computing device connected with the USPVS platform and the operating system wherein the creating of secure tunnel lead to a script awaiting an authentication of the USPVS platform;
   performing a remote code execution task on the USPVS platform, wherein the remote code is executed in a single instance session for virtualization of the operating system and the applications;
   displaying an encrypted content for an OS virtualization tasks and a plurality of application executions;

breaking the tunnel on shutting down of the operating system or an application, wherein the breaking of tunnel restricts an access of an unauthorized device to the operating system or the application.

8. The method according to claim 7, wherein the communication channel for connecting the computing device is a standalone domain based connection with virtual interfaces to communicate data across networks, wherein the networks comprises a Personal Area Network (PAN), a Local Area Network (LAN), a Wide Area Network (WAN), a Metropolitan Area Network (MAN), a Storage Area Network (SAN), an Enterprise Private Network (EPN), a Virtual Private Network (VPN), switches and routers.

* * * * *